United States Patent [19]

Gouvenot

[11] Patent Number: 4,762,443
[45] Date of Patent: Aug. 9, 1988

[54] METHOD OF RENDERING SOILS IMPERVIOUS

[75] Inventor: Daniel Gouvenot, Clichy, France

[73] Assignee: Soletanche, Nanterre, France

[21] Appl. No.: 891,776

[22] Filed: Jul. 30, 1986

[30] Foreign Application Priority Data

Aug. 1, 1985 [FR] France ................................ 85 11773

[51] Int. Cl.$^4$ ................................................ E02D 3/12
[52] U.S. Cl. ...................................... 405/263; 106/98; 106/120; 405/266
[58] Field of Search ............... 405/258, 263, 266, 270; 106/78, 98, 118, 120

[56] References Cited

U.S. PATENT DOCUMENTS 4,329,090  5/1982  Teague et al. ...................... 405/263
4,521,136  6/1985  Murphey ............................ 405/263

Primary Examiner—David H. Corbin
Attorney, Agent, or Firm—Thomas A. O'Rourke

[57] ABSTRACT

The invention relates to a method of rendering a soil or another material like a mortar, a binder, or a concrete impervious by injecting it with a silica solution. A finely ground powdered compound containing calcium with a solubility in water of between approximately 0.01 g/l and approximately 2 g/l is mixed into the silica solution, which has a ratio of $SiO_2$ to $Na_2O$ of between 1 and 1.3, before injection.

4 Claims, No Drawings

METHOD OF RENDERING SOILS IMPERVIOUS

The present invention relates to a method of rendering soils and other materials like mortars, binders, concretes, etc., which are already in place and turn out to be too porous, impervious.

Methods of rendering materials of this type impervious are known. They consist of injecting the soil with a silica solution like that described in Luxembourg Patent No. 84 196, wherein the ratio of $SiO_2$ to $Na_2O$ for example is less than 2 and preferably between 1.5 and 1.8.

When the solution is to be injected into soils or other materials that are low in lime or calcium, it is necessary in practice to inject calcium salts, like for example a water-soluble calcium chloride, before injecting the silica solution.

Although mixing the soluble calcium salts into the silica solution has been proposed, the reaction between the salts and the solution usually occurs within ten minutes, which makes mixing before injection hardly practicable, and it is necessary in practice to procede in two stages, which not only complicates the method but also makes it difficult to ensure the quality of the resulting imperviousness because, if the silica solution and the calcium salt are not present at every point in the soil, the imperviousness may not be perfect.

The present invention relates to a method and to materials for carrying it out that will make it possible to render a soil or other porous material impervious by injecting a single product, which will then take more than an hour to set and will ensure reliable and economical imperviousness.

One object of the present invention is a method of rendering a soil or a material like a mortar, a binder, or a concrete impervious by injecting it with a silica solution, characterized in that a finely ground powdered compound containing calcium with a solubility in water of between approximately 0.01 and approximately 2 g/l is mixed into the silica solution, which has a ratio of $SiO_2$ to $Na_2O$ of between 1 and 1.3, before injection.

It is possible in accordance with the invention to employ a finely ground powdered calcium carbonate ($CaCO_3$) consisting for example of a marble, of a limestone, or of a finely ground calcite as the powdered compound. It is also possible to employ powdered lime [$Ca(OH)_2$]. The size of the particles of the powder containing the calcium depends on the size of the interstices in the material that is to be rendered impervious.

The powdered compound with particles of the desired size can be obtained in accordance with the invention by grinding marble, calcite, or chalk. If the aforesaid grinding does not result in particles of the desired size, the powder is suspended in water, a deflocculant like a naphthalene-type compound is added, and the suspension is left to stand in a decanting tank until the supernatant contains only particles smaller than the maximum desired.

Deflocculation can also be achieved by physical means—ultrasound, vibration, etc.

The silica solution employed in accordance with the invention has a ratio of $SiO_2$ to $Na_2O$ of between approximately 1 and 1.3, its $SiO_2$ content being preferably between 10 and 20% and its $Na_2O$ content being preferably between 10 and 15%.

When the mixture of silica solution and powdered compounds containing calcium is injected into the soil, the $Ca^{2+}$ ions are slowly liberated by hydrolyis and react with the silica solution to create lime-silicate hydrates. Due to a shift in the chemical equilibrium, the capture of the $Ca^{2+}$ ions allows renewed liberation of new ions by hydrolysis, resulting in a reaction that is continuous rather than coarse and rash, extending over several hours and making the method in accordance with the invention possible.

Another object of the invention is a composition intended for injection into soils or other materials like mortars, binders, or concretes in order to render them impervious. The composition is characterized in that it comprises a combination of a silica solution with a ratio of $SiO_2$ to $Na_2O$ of between 1 and 1.3 and a finely ground powdered material containing calcium with a water solubility of between approximately 0.01 and 2 g/l.

It is possible in accordance with the invention to attain setting times, generally between 1 and 12 hours, that will facilitate injecting the mixture.

The setting time can be controlled by affecting the solubility of the particular calcium-based compound employed, it being understood that the setting time will vary inversely with the solubility of the compound.

The setting time is also a function of the ratio of $SiO_2$ to $Na_2O$ and varies in the same sense. If, however, the ratio of $SiO_2$ to $Na_2O$ is higher than approximately 1.3, the silica will crystallize poorly and, if the ratio is less than 1, mechanical resistance will be too low and the desired result will not be achieved.

The invention will now be specified with reference to the following examples, which must in no way be considered as limiting the scope of the invention in any way.

EXAMPLE 1

To render a fine sand impervious by injecting it, a suspension of powdered $CaCO_3$ is prepared from finely ground marble, limestone, or calcite. The powder has a solubility in water of approximately 0.01 g/l.

This is done by mixing 200 to 500 kg of powdered calcium carbonate with particles initially measuring less than 50 $\mu$m into 1000 l of water.

A deflocculant consisting for example of a naphthalene-type compound is added to the suspension.

The suspension is allowed to settle for between ¾ of an hour and 1 hour, subsequent to which the particles of the powder suspended in the supernatant will be smaller than 10 $\mu$m.

A Silica solution with a ratio of $SiO_2$ to $Na_2O$ of approximately 1 is then conventionally prepared.

0.5 parts by volume of the suspension of calcium carbonate is then mixed with 1.5 parts by volume of the silica solution.

The resulting composition remains very fluid.

The composition is injected under pressure by a conventional technique into the fine sand, which, after several hours, becomes impervious and resistant.

The setting time is between 1 and 3 hours.

Analysis indicates lime silicates in the pores between the sand.

EXAMPLE 2

The method is the same as that employed in Example 1 except that the ratio of $SiO_2$ to $Na_2O$ in the silica solution is 1.3.

The setting time is between 2 and 10 hours.

EXAMPLE 3

The method is the same as that employed in Example 1 except approximately 100 to 300 kg of powdered lime [Ca(OH)$_2$] per liter of water is employed instead of the marble, limestone, or calcite.

The setting time is between 30 minutes and 2 hours.

The method specified herein should not of course be construed as limiting the invention in any way. The method may accordingly be modified in many ways without exceeding the scope the invention.

It is in particular possible to use different types of silica solution.

Furthermore, the calcium-containing agents can be materials other than powdered calcium carbonate as long as the compounds progressively liberate calcium ions into the silica solution by hydrolysis in such a way as to initiate a progressive reaction.

I claim:

1. Method of rendering a soil or a material like a mortar, a binder, or a concrete impervious by injecting it with a silica solution, characterized in that a finely ground powdered compound containing calcium with a solubility in water of between approximately 0.01 g/l and approximately 2 g/l is mixed into the silica solution, which has a ratio of SiO$_2$ to Na$_2$O of between 1 and 1.3, before injection.

2. Method as in claim 1, characterized in that the compound that contains calcium is a powdered calcium carbonate (CaCO$_3$) consisting for example of a marble, of a limestone, or of calcite.

3. Method as in claim 1, characterized in that the compound that contains calcium is powdered lime [Ca(OH)$_2$].

4. Method as in one of the foregoing claims, characterized in that the powdered compound containing calcium and intended to be mixed with the silica solution is obtained by suspending the ground particles in water, adding a deflocculant like a naphthalene-type compound, and letting the suspension stand in a decanting tank until the supernatant contains only particles smaller than the maximum desired.

* * * * *